United States Patent
Clegg et al.

(10) Patent No.: US 6,721,845 B1
(45) Date of Patent: Apr. 13, 2004

(54) ALGORITHM FOR MAINTAINING MAXIMUM STREAMING PERFORMANCE OF MIRRORED DISKS

(75) Inventors: Roger T. Clegg, Wichita, KS (US); Craig Charles McCombs, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 90 days.

(21) Appl. No.: 09/962,541

(22) Filed: Sep. 24, 2001

(51) Int. Cl.[7] .................. G06F 12/00; G06F 12/14; G06F 12/16; G06F 13/00; G06F 13/28

(52) U.S. Cl. .................. 711/114; 711/112; 709/105; 709/201; 714/6

(58) Field of Search .................. 711/114, 112; 709/105, 201; 714/6

(56) References Cited

U.S. PATENT DOCUMENTS

| | | | | |
|---|---|---|---|---|
| 6,112,257 A | * | 8/2000 | Mason et al. | 710/18 |
| 6,223,206 B1 | * | 4/2001 | Dan et al. | 709/105 |
| 6,237,063 B1 | * | 5/2001 | Bachmat et al. | 711/114 |
| 6,438,652 B1 | * | 8/2002 | Jordan et al. | 709/203 |

\* cited by examiner

*Primary Examiner*—Donald Sparks
*Assistant Examiner*—Dinh Ngoc
(74) *Attorney, Agent, or Firm*—Carstens, Yee & Cahoon LLP

(57) ABSTRACT

A reading algorithm for a set of mirrored disks sends groups of reads to one disk, then sends the next group to the other disk. This provides a more optimal use of disks for sequential reads than previous algorithms. An enhanced version uses snooping of the read requests and switches disks immediately for the read if the requests are not sequential, or within a given number of records of sequential. Additionally, the size of the requests can change the number of requests grouped together in the enhanced version.

15 Claims, 5 Drawing Sheets

ALGORITHM FOR MAINTAINING MAXIMUM STREAMING PERFORMANCE OF MIRRORED DISKS

BACKGROUND OF THE INVENTION

1. Technical Field

The present invention is directed to a data processing system. Particularly, the present invention provides a method and apparatus for streaming data from a storage device. More particularly, the present invention provides a method and apparatus for improving the performance of streaming data from mirrored disks.

2. Description of the Related Art

In order to ensure that important data is not lost, it has long been a necessity to maintain backup copies. While this originally meant making copies periodically, e.g., at the end of each week or the end of each working day, mirrored disk techniques make this a completely automatic process.

To implement mirrored disks, the storage controller is informed that two disks are to form a mirrored pair, but will be referred to as a single disk, e.g., as disk F: in FIG. 3. From that point on, when the operating system writes to disk F:, the information is written to both of the mirrored disks. However, when the operating system reads from disk F:, only one of the two disks needs to be read, as they are duplicates.

Because two copies of the data exist, it is theoretically possible to achieve the combined read performance of two disk when reading disk F: by dividing the reads between the two copies. The actual performance achieved depends on the efficiency of the technique used to distribute the reads between the two disks.

A contemporary method to improve mirrored read performance is simply to alternate read requests to one and then the other disk in the mirrored pair. However, tests reveal that for groups of sequential reads (which is one of the standard performance tests for disks), the performance of the mirrored pair does not reach the combined read performance anticipated for both disks. To understand this better, it is helpful to know how data is stored on a disk.

FIG. 1A–C demonstrates several aspects of a disk drive. The disk drive 100 is composed of a number of platters 110, 112, and 114. Platters 110, 112, and 114 are stacked on a spindle (not shown), with space between the platters. Each one of platters 110, 112, and 114 has two sides; each side has a metallic coating that stores data by changing the polarity of tiny magnetized zones retained in the metallic coating of the platter. The polarity is set by a read/write head 120, which rides just above the surface of the platter 110. Read/write head 120 is constructed so that when a current is passed through it, the head can polarize the magnetized zones in the metallic coating under read/write head 120; when there is no current through the head, it will sense the polarity of the magnetized zones. A separate read/write head, such as read/write head 120, is provided for both sides of platters 110, 112, and 114. The heads are collectively mounted on an arm 130, such that all the heads move together from the outer rim of the platters toward the center and back. In the example, with the three platters 110, 112, and 114, there is a total of six heads (only three are shown), but only one head can be active at any given time.

Each platter is divided into tracks 140, which are arranged in concentric bands on each platter, much like the annual rings on a tree. Each track 140 is further divided into sectors 150, which contain a given number of bytes, generally 512 bytes. These sectors are generally numbered sequentially beginning from either the outer or inner track. Normally the outer tracks contain more sectors than the inter tracks.

Once a disk receives a request to read a particular sector or sequence of sectors, the time until the first sector is read depends not only on the rotational speed of the disk, but also on where the platter and track containing the sector(s) is located in relation to where the head is currently positioned. Mechanical movements, such as moving the arm 130 and read/write heads 120 to another track or turning the platter until the proper sector 140 passes under the head, require long mechanical settling and rotational times to lock onto a track and then wait for the starting sector to rotate to the head. These mechanical delays or latencies are collectively referred to as disk seek time. Reading sectors immediately following the first one accessed requires significantly less time than the preparatory mechanical disk seek latencies.

Given the lengthy latencies of these mechanical operations, disks are typically organized in cylinders. A cylinder is composed of all of the tracks having the same relative disk platter position. For our theoretical disk with platters 110, 112, and 114, tracks 161, 162, and 163 are the outermost tracks on the upper side of their respective platter. Together with the three outermost tracks on the reverse sides of platters 110, 112, and 114, they form a cylinder. Since no mechanical movement of the arm 130 is necessary to move between surfaces in one cylinder, it is advantageous to write sequential data records so that they fill the current cylinder before moving to the next cylinder.

Two other latency reducing techniques are typically employed by modern disks. First, modern disks are equipped with their own microprocessor and memory (not shown). One of the tasks of the code executing on the disk microprocessor is to optimize read requests, by sorting their relative order to minimize the number and distance of mechanical movements, thereby reducing total seek time. Secondly, most modern disks will read one or more blocks beyond the in requested read data and store this data in a memory called a cache. This supplementary read operation is typically referred to as read-ahead. If the next read request sequentially follows the last, then the needed data is already waiting in the cache. The second sequential read request is typically satisfied with read data already stored in the cache thereby reducing read time significantly.

For read requests to a single disk, data on the same or consecutive tracks, addressed by linearly increasing block number, has the lowest disk latencies and provides the highest throughput. This is because consecutive blocks are more likely to exist on the same cylinder, and because the data is organized on the disk so that after the first read, reads to consecutive blocks require no seek time, until the end of the cylinder is reached. Additionally, since the disk continuously performs read-ahead, much of the read data is already available in the disk cache when a read request is received. This increases disk throughput even further.

This brings us back to the reason why sending every other sequential read request to one of the two mirrored disks doesn't result in optimal mirrored disk throughput. When the disk is reading ahead two or more blocks, but receiving requests for every other block, only half of the read data stored in the cache memory is utilized. The result is that disk read-ahead optimization is undermined by issuing every other mirrored read request to one and then the other of the mirrored disks.

Since performance of random reads is known to improve by alternating between the two disks, one current approach is to divert sequential reads to only one disk, and send random reads alternately to each of the disks. The best sequential read performance achieved with this method is equal to that of a single disk.

Another suggested performance optimization for mirrored disks is to use special disk commands (i.e., mode page commands). These commands allow access to internal disk settings and can alter the number of sectors by which the disk reads ahead or change to a different type of caching algorithm. The problem with this solution is that the mode page commands are difficult to use and are not supported consistently by all disks. It is therefore very desirable to have a simple algorithm for reading mirrored disk that enhances sequential read performance without disrupting random and read-ahead disk optimizations.

SUMMARY OF THE INVENTION

The present invention discloses an algorithm that can be used in controlling reads to mirrored disks, in order to improve the performance in reading sequential data without degrading random reads. In a first basic embodiment, read requests are directed to a first disk until a threshold number of requests have been sent, then read requests are directed to the other disk in the pair until the threshold is once again reached. In one presently preferred embodiment, the value of the threshold is programmed in firmware in the storage controller card. While any threshold value greater than 1 improves performance over simple toggling, eight to sixteen requests is the currently preferred range, with eight being the presently preferred threshold.

In another embodiment, several additional factors are added to the embodiment above. First, the controller snoops the IO requests to determine if they are sequential, or within a specified number of blocks from the last request. If they are, the controller continues grouping the requests as described above. However, if the conditions are not met, the controller switches to the other disk and begins sending requests to it. Finally, if the controller determines that the current mix of sequential and random requests and/or the size of the requests dictates that a different threshold would better serve the current environment, the threshold number is dynamically changed to be more appropriate.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1A:
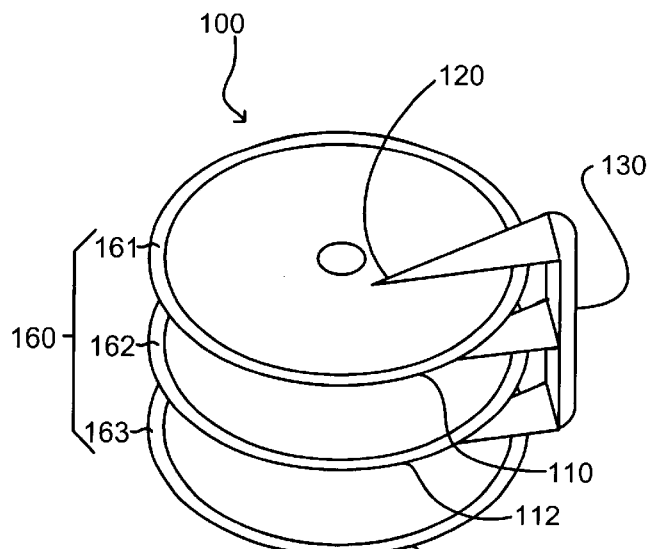
FIG. 1A–C are views of a disk, showing component parts.
Figure 1B:
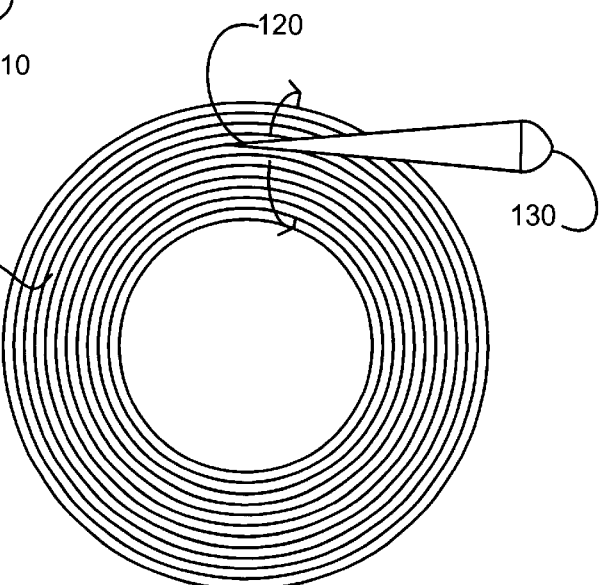
Figure 1C:
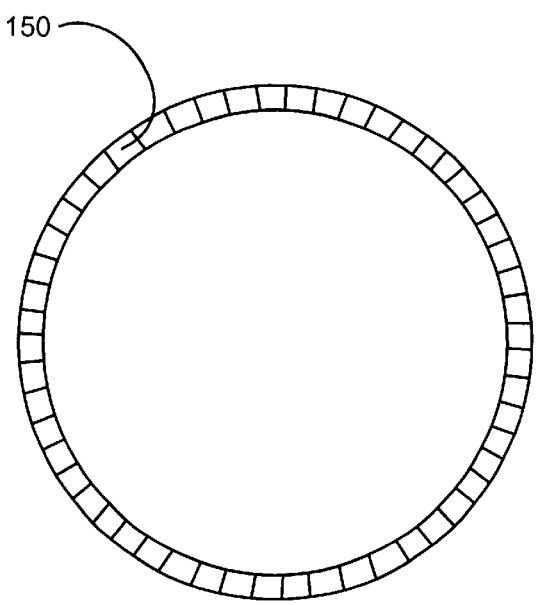
Figure 2:
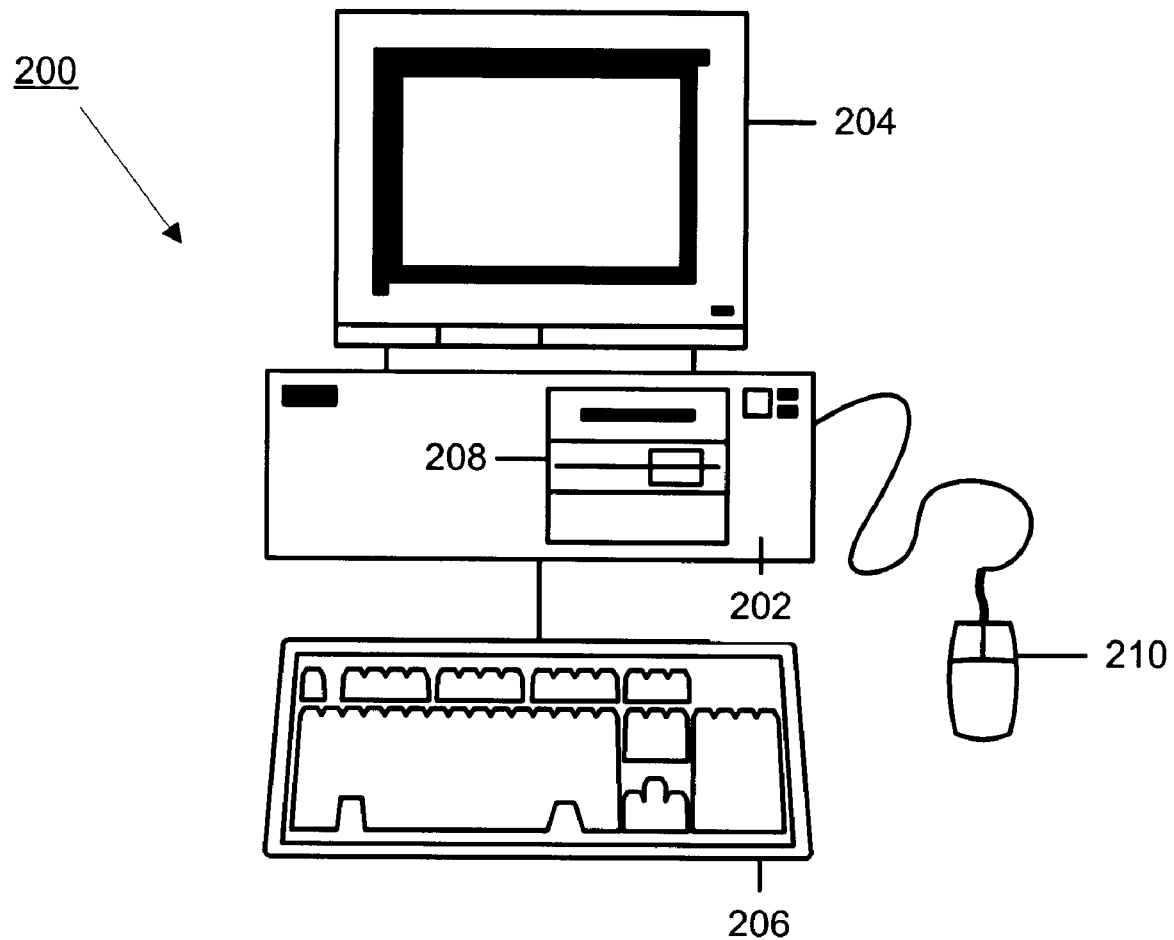
FIG. 2 is a pictorial representation of a data processing system in which the present invention may be implemented.

With reference now to the figures and in particular with reference to FIG. 2, a pictorial representation of a data processing system in which the present invention may be implemented is depicted in accordance with a preferred embodiment of the present invention. A computer 200 is depicted which includes system unit 202, video display terminal 204, keyboard 206, storage devices 208, which may include floppy disks and other types of permanent and removable storage media, and mouse 210. Additional input devices may be included with personal computer 200, such as, for example, a joystick, touchpad, touch screen, trackball, microphone, and the like. Although the depicted representation shows a computer, other embodiments of the present invention may be implemented in other types of data processing systems, such as a network server computer.

Figure 3:
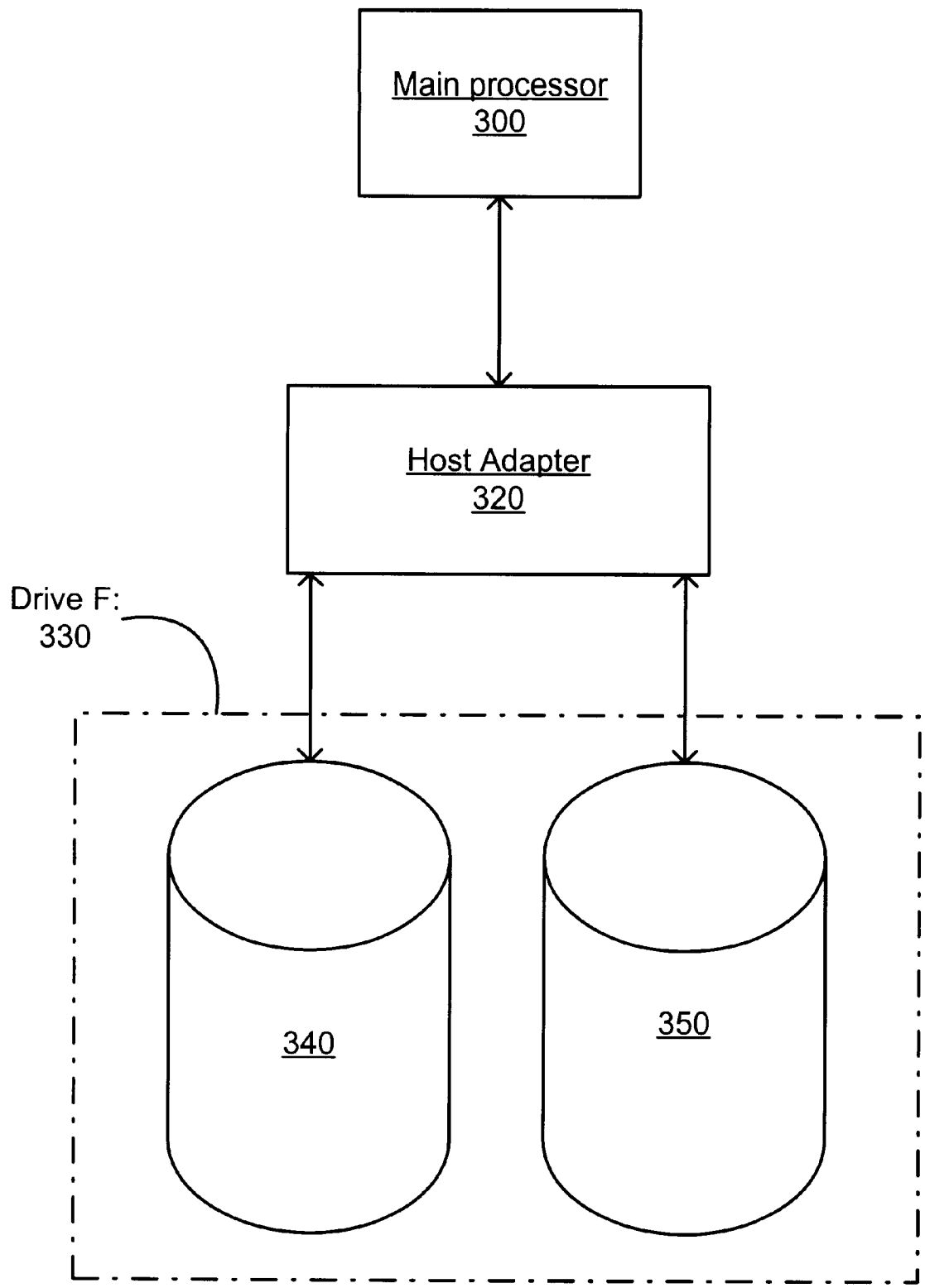
FIG. 3 is a block diagram illustrating the relationship between the processor, storage controller or host adapter, and the disks in a system having mirrored disks.

With reference now to FIG. 3, a simplified representation is shown of a computer, such as computer 200 in FIG. 2, having a pair of mirrored disks. This representation shows the main processor 300 and disk F: 330, which in this instance is the mirrored disk pair 340, 350. Between main processor 300 and disk 330 is storage controller or host adapter 320. Host adapter 320 receives input/output requests from programs in main processor 300, then passes them on to both of disks 340 and 350, if the requests is for a write, but to only one or the other of disks 340 and 350 if the request is for a read. In the presently preferred embodiment, the algorithm is implemented in a Fibre Channel (FC) host adapter 320 but is applicable to any type of disk IO technology.

Figure 4:
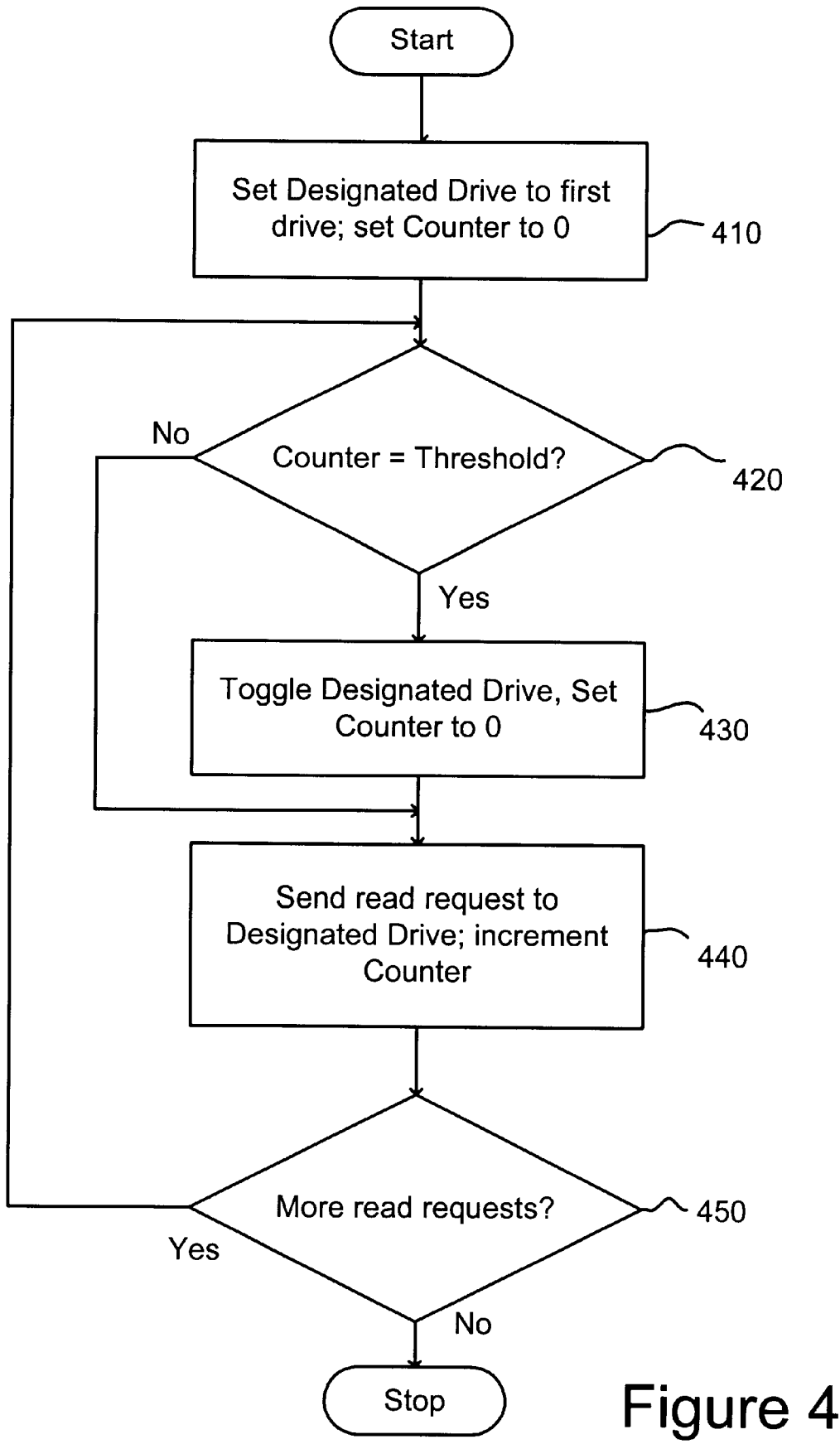
FIG. 4 is a basic algorithm in accordance with a preferred embodiment of the invention.

With reference to FIG. 4, the process begins at step 410 with setting one of the mirrored disks as the Designated Disk to receive current read requests. A counter for read requests is set to zero. This step can be performed once, when the computer is first turned on, or can be set each time read requests are received after a designated period of idleness. In step 420, the counter is checked against the threshold value that has been previously set. If the two are equal, the process goes to step 430, where the Designated Disk is changed to the other disk in the mirrored pair and the counter is reset to zero. If the counter is still less than the threshold, step 430 is skipped. In step 440, the read request is forwarded to the Designated Disk and the counter is incremented by one. Step 450 looks for new read requests. If new requests are present, the process returns to step 420 where the counter in checked, otherwise the process ends.

This technique increases the performance of the mirrored pair over simple toggling or alternating read requests between the two mirrored disks. In tests, where 8 to 16 requests were sent to one disk before changing to the other disk, this algorithm delivers mirrored read disk performance approaching that of the two combined individual disks. In a setting where most individuals reads were of a larger size, the number of requests sent to each disk before switching can be decreased if a minimum or optimal disk IO queue depth is maintained.

Figure 5:
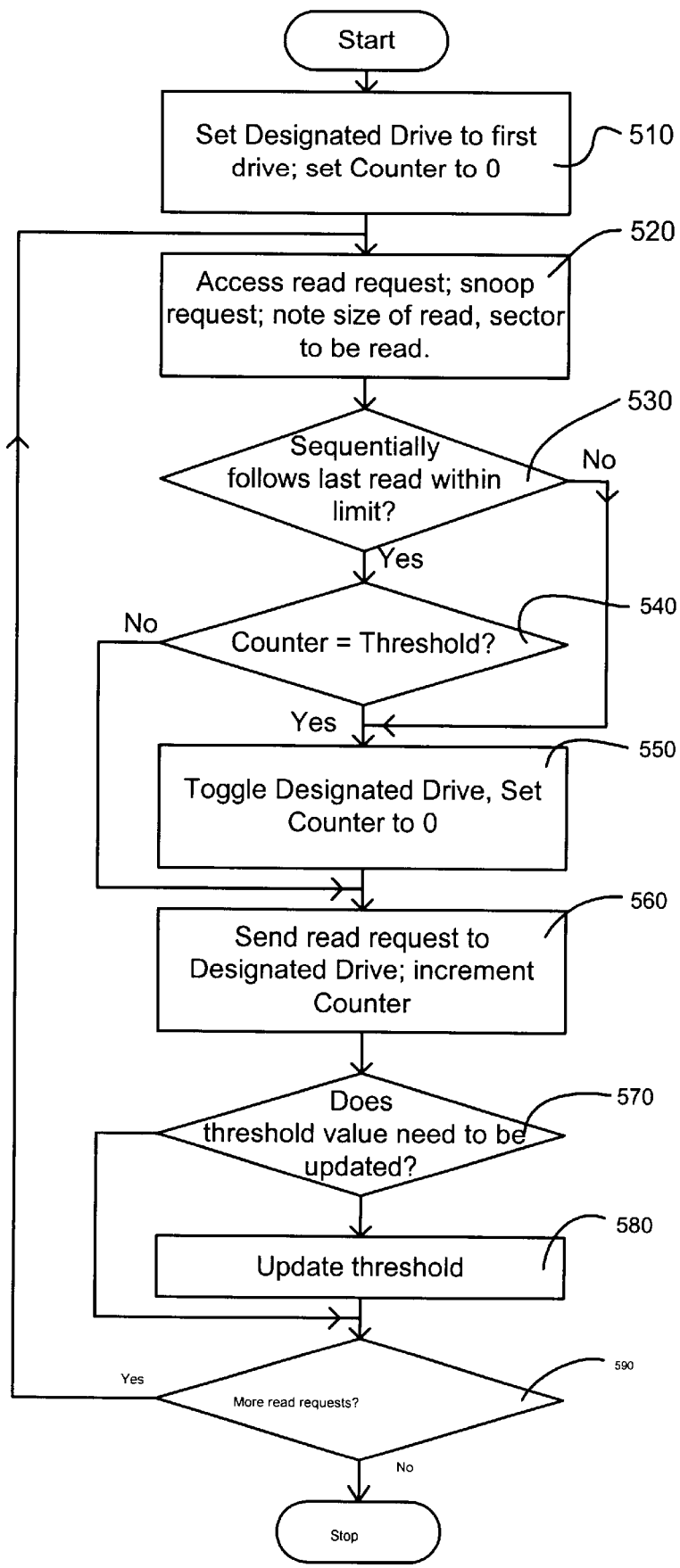
FIG. 5 is an enhanced algorithm in accordance with a preferred embodiment of the invention.

With reference to FIG. 5, an enhanced version of the process will now be explained. The process begins with step 510, where the disk designation and counter are initialized, as in the basic embodiment. In step 520, the request is accepted and snooped to determine its size and at what sector it is to begin reading. The request is then checked, in step 530, to see if the current request sequentially follows the last. In this embodiment, if desired, the current request does not have to be the next sequential record, but may be within a specified number of records from the last request. For instance, if the disk performs read-ahead for additional sectors, this limit can be set to accept any request falling within a specified range of sectors to pass the sequential test. If the request does not meet the sequential test of step 530, the algorithm proceeds to step 550, where the designated disk is changed and the counter is reset to zero, otherwise an additional step is performed in step 540. Step 540 checks to see if the counter is equal to the threshold, as before. If the answer is yes, step 550 is performed to toggle the designated disk and to reset the counter to zero; otherwise step 550 is skipped. Step 560 sends the read request to the designated disk and increments the counter by 1.

Step 570 determines, from the average size of data blocks requested in the most recent reads, if the threshold value needs to be changed. This derives from the fact that, during testing of this algorithm, it was realized that when small blocks of data were being read (e.g. 0.5K), the threshold value needed to be larger than if relatively large blocks of information (e.g. 32K) were being read. It is anticipated that the threshold value would not be changed rapidly, but if a general shift in the size of the blocks read does occur, this provides a means of further optimizing performance. If it is determined that a change in the threshold value would be beneficial, the process goes to step 580, where the threshold value is set to a more efficient value, otherwise this step is skipped. Finally, in step 590, it is determined if further requests are being received. If they are, the algorithm continues from step 520, otherwise the process is complete.

Using this enhanced algorithm adds some complexity and requires the time to snoop each read request, but if implemented in hardware, it provides an opportunity for even higher mirrored read disk performance.

In the embodiment disclosed above, the algorithm is implemented in the storage controller or host adapter card. In an alternate embodiment, the control of the mirrored disks, and therefore the implementation of the algorithm, is handled in the operating system driver level.

Finally, many newer operating systems bypass the Basic Input/Output System (BIOS) in handling input/output (I/O), but in a further alternate embodiment, this control algorithm is implemented in the BIOS software.

Although the invention has been described in terms of a single pair of mirrored disks, this process can also be used with other redundant disks configurations. For example, the process adapts to disks that, in addition to being mirrored, are striped as well. (Combining striping and mirroring uses several disks to store a copy of files, so that reading and writing can be shared among all the disks. Just as filling a cylinder before writing the next can cause less head movement, using different disks can spread the load for more efficient input/output.)

Thus, the present invention provides an algorithm by which the performance of reading a set of mirrored disks can be greatly improved, by significantly increasing the flow-through when sequential records are being read.

The present invention is applicable to two or more mirrored disks and to all methods of handling the mirroring on those disks.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

While the present invention has been described in terms of a hardware based apparatus, those of ordinary skill in the art will appreciate that the processes of the present invention are capable of being distributed in the form of a computer readable medium of instructions having a variety of forms and that the present invention applies equally regardless of the particular type of signal bearing media actually used to carry out the distribution. Examples of computer readable media include recordable-type media such a floppy disc, a hard disk, a RAM, and CD-ROMs and transmission-type media such as digital and analog communications links.

What is claimed:

1. A method for reading from a set of disks which are being maintained as identical copies, said method comprising the computer implemented steps of:

determining a first one of said set of disks to be a designated disk to receive read requests;

settings a counter to zero;

sending a current read request to said designated disk;

incrementing said counter in response to sending said current read request;

if said count is equal to a predetermined threshold, making a different one of said set of disks to be said designated disk and said counter to zero;

repeating said sending step, said incrementing step, and said making step as long as read request are received; and snooping said read requests prior to sending them to said designated disk and changing said designated disk if a current read request is non-sequential within a designated number of sectors of an immediate read request.

2. A method of reading from a set of disks which are being maintained as identical copies, said method comprising the computer implemented steps of:

determining a first one of said set of disks to be a designated disk to receive read requests;

settings a counter to zero;

sending a current read request to said designated disk;

incrementing said counter in response to sending said current read request;

if said count is equal to a predetermined threshold, making a different one of said set of disks to be said designated disk and said counter to zero;

repeating said sending step, said incrementing step, and said making step as long as read request are received; and snooping said read requests and dynamically changing said predetermined threshold based on size of information requested in a set of most resent read requests.

3. The method of claim 2 wherein said steps are implemented in firmware in a device controller.

4. The method of claim 2 wherein said steps are implemented in a Base Input Output System software.

5. The method of claim 2 wherein said steps are implemented in the operating system driver level.

6. A computer system, comprising:

a data input device;

a data output device;

a main processor connected to receive data from said data input and output information through said data output device;

a set of mirrored disks connected to said processor through a device controller, said mirrored disks being maintained as identical disks and said mirrored disks being treated by said main processor as a single disk drive; and a set of stored instructions for execution by a read processor capable of performing the following steps:

setting an initial one of said set of mirrored disks as a designated disk;

settings a counter to zero;

after said setting steps, performing the following steps repetitively as long as read request for said set of mirrored disk are received:

as each read request is received, sending said real request to said designated disk and incrementing said counter; and if said counter is equal to a predetermined threshold, resetting said counter to zero and making another of said set of mirrored disks the designated disk; and snooping said read request and dynamically changing said predetermined threshold based on the size of information requested in a set of most recent read request.

7. The computer system of claim 6, wherein said processor is said device controller.

8. The computer system of claim 6, wherein said processor is said main processor.

9. The computer system of claim 6, wherein said set of mirrored disks consist of two disks.

10. The computer system of claim 6, wherein said set of stored instructions is in firmware in said device controller.

11. The computer system of claim 6, wherein said set of stored instructions is in software in a system memory.

12. A computer program product comprising the computer executable steps of:

recognizing a set of disks to be mirrored disks that are maintained as identical disks;

setting an initial one of said set of mirrored disks as a designated disks;

setting a counter to zero;

after said setting steps, performing the following steps repetitively as long as read requests are received;

as each read request is received, snooping said request, noting memory to be read and a sector to be read, if said counter is not equal to a predetermined threshold and said sector to be read is within a specified number of sequential sectors from a last sector to be read, then doing nothing, otherwise, making a different one of said set of mirrored disks said designated disks and setting said counter to zero, sending said read request to said designated disk and incrementing said counter, determining whether a threshold value needs to be updated, according to a size of data to be read determined in said snooping step, and updating if necessary.

13. The computer program product of claim 12, wherein said determining step ascertains whether an average size of data to be read has changed by a present amount.

14. The computer program product of claim 12, wherein said specific number of sequential sectors equal zero.

15. The computer program product of claim 12, wherein said threshold is a number chosen from the group consisting of integers eight through sixteen.

* * * * *